(12) United States Patent
Shaffer et al.

(10) Patent No.: US 9,362,746 B2
(45) Date of Patent: Jun. 7, 2016

(54) COMMUNICATION NETWORK TOPOLOGY MANAGEMENT BASED ON AN ASSOCIATED ELECTRIC GRID TOPOLOGY

(75) Inventors: Shmuel Shaffer, Palo Alto, CA (US); Jun Zha, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 618 days.

(21) Appl. No.: 13/269,069

(22) Filed: Oct. 7, 2011

(65) Prior Publication Data

US 2013/0091258 A1 Apr. 11, 2013

(51) Int. Cl.
G06F 15/177 (2006.01)
G06F 15/173 (2006.01)
H02J 3/00 (2006.01)

(52) U.S. Cl.
CPC ............. *H02J 3/00* (2013.01); *H02J 2003/007* (2013.01); *Y02E 60/728* (2013.01); *Y02E 60/76* (2013.01); *Y04S 10/265* (2013.01); *Y04S 40/22* (2013.01)

(58) Field of Classification Search
CPC ... H04L 41/12; H04L 41/046; H04L 41/0631; H04L 41/069; H04L 41/145–41/147; H04L 43/08; H04L 43/0829; H04L 63/00; H04L 12/2803
See application file for complete search history.

(56) References Cited

U.S. PATENT DOCUMENTS

| | | | |
|---|---|---|---|
| 6,115,468 A | 9/2000 | De Nicolo | |
| 6,295,356 B1 | 9/2001 | De Nicolo | |
| 7,545,055 B2 | 6/2009 | Barrass | |
| 8,001,475 B2 | 8/2011 | Chen et al. | |
| 8,447,434 B1* | 5/2013 | Harris et al. | 700/286 |
| 2005/0021742 A1* | 1/2005 | Yemini et al. | 709/224 |
| 2005/0169185 A1* | 8/2005 | Qiu et al. | 370/241 |
| 2005/0204028 A1* | 9/2005 | Bahl et al. | 709/223 |
| 2006/0092861 A1* | 5/2006 | Corday et al. | 370/256 |
| 2007/0143552 A1 | 6/2007 | Rastogi et al. | |
| 2007/0201494 A1* | 8/2007 | Lou et al. | 370/401 |
| 2009/0112375 A1* | 4/2009 | Popescu | 700/292 |
| 2010/0052421 A1 | 3/2010 | Schindler et al. | |
| 2010/0217550 A1* | 8/2010 | Crabtree et al. | 702/62 |
| 2010/0231160 A1 | 9/2010 | Shaffer et al. | |
| 2010/0250668 A1 | 9/2010 | Toebes et al. | |
| 2010/0256846 A1 | 10/2010 | Shaffer | |
| 2011/0069709 A1* | 3/2011 | Morris et al. | 370/394 |

(Continued)

OTHER PUBLICATIONS

"AREVA's E-terra Solution to Supervise Wind Power Generation on the French Grid", Transmission and Distribution World, Mar. 2009, 1 page.

(Continued)

*Primary Examiner* — Abdullahi E Salad
(74) *Attorney, Agent, or Firm* — Parker Ibrahim & Berg LLC; James M. Behmke; Stephen D. LeBarron

(57) ABSTRACT

In one embodiment, a computer determines a grid topology of an electric grid based on one or more electric grid configuration description files, and also determines a network topology of a computer network used to provide communication to grid devices of the electric grid. By assessing whether the network topology is configured to meet one or more communication requirements of the grid topology (e.g., initially and/or through monitoring for grid changes), the computer may trigger a corrective action (e.g., alarm or reconfiguration) in response to the network topology not being configured to meet the one or more communication requirements of the grid topology.

21 Claims, 12 Drawing Sheets

(56) References Cited

U.S. PATENT DOCUMENTS

| | | | |
|---|---|---|---|
| 2011/0103274 A1* | 5/2011 | Vavik | 370/293 |
| 2011/0116387 A1* | 5/2011 | Beeco et al. | 370/242 |
| 2011/0119390 A1* | 5/2011 | Leech | H04L 41/12 709/228 |
| 2011/0119517 A1* | 5/2011 | Beeco | H04L 41/0677 713/340 |
| 2011/0313581 A1* | 12/2011 | Genc et al. | 700/292 |
| 2012/0029897 A1* | 2/2012 | Cherian et al. | 703/18 |
| 2012/0253540 A1* | 10/2012 | Coyne et al. | 700/297 |
| 2012/0323381 A1* | 12/2012 | Yadav | H04L 63/0236 700/286 |

OTHER PUBLICATIONS

"Voltage Regulator Services", Siemens, http://www.energy.siemens.com, accessed Oct. 2011, 1 page.

* cited by examiner

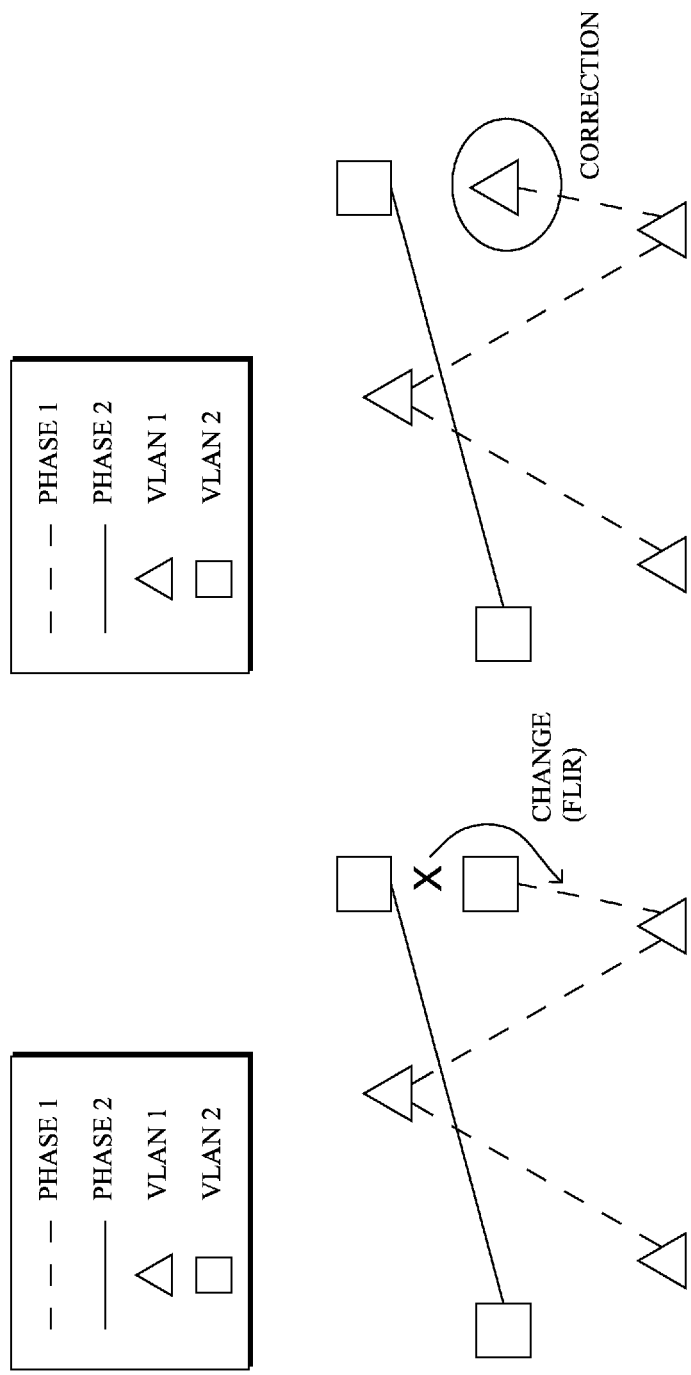

COMMUNICATION NETWORK TOPOLOGY MANAGEMENT BASED ON AN ASSOCIATED ELECTRIC GRID TOPOLOGY

TECHNICAL FIELD

The present disclosure relates generally to electric grids and communication networks, and, more particularly, to management of associated communication network operations for the associated electric grid.

BACKGROUND

Electric power is generally transmitted from generation plants to end users (residential, commercial, and industrial (C&I), etc.) via a transmission and distribution grid consisting of a network of power stations, transmission circuits, and substations interconnected by powerlines. Once at the end users, electricity can be used as energy to power any number of devices.

The Common Information Model (CIM) is an International Electrotechnical Commission (IEC) standard which facilitates and simplifies information exchange (such as configuration, topology, status of an electrical network, etc.) amongst various applications. The standard utilizes a Unified Modeling Language (UML) model to define a common vocabulary and basic ontology for aspects of the electric power industry. The central package within the CIM is the "wires model" which describes the basic components used to transport electricity.

CIM can be used to derive "design artifacts" as needed for the integration of related application software (e.g., Extensible Markup Language (XML) Schema, Resource Description Framework (RDF) Schema). Various additional standards may be used with CIM to provide energy management systems, outage management systems, supervisory control and data acquisition (SCADA), planning, and optimization. In addition, other models (standards) may be used for grid visualization, planning, operations, and simulations.

Similarly, the Substation Configuration Description Language (SCL) is a language and representation format used for the configuration of electrical substation devices, such as for representation of modeled data and communication services.

Notably, however, CIM and SCL provide only limited communication architecture support. Moreover, existing tools, primarily for visualization, do not support any computer (Internet Protocol) network configuration or provisioning.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 9A-9B illustrate an example of responsive network reconfiguration; and

DESCRIPTION OF EXAMPLE EMBODIMENTS

Overview

Figure 1:
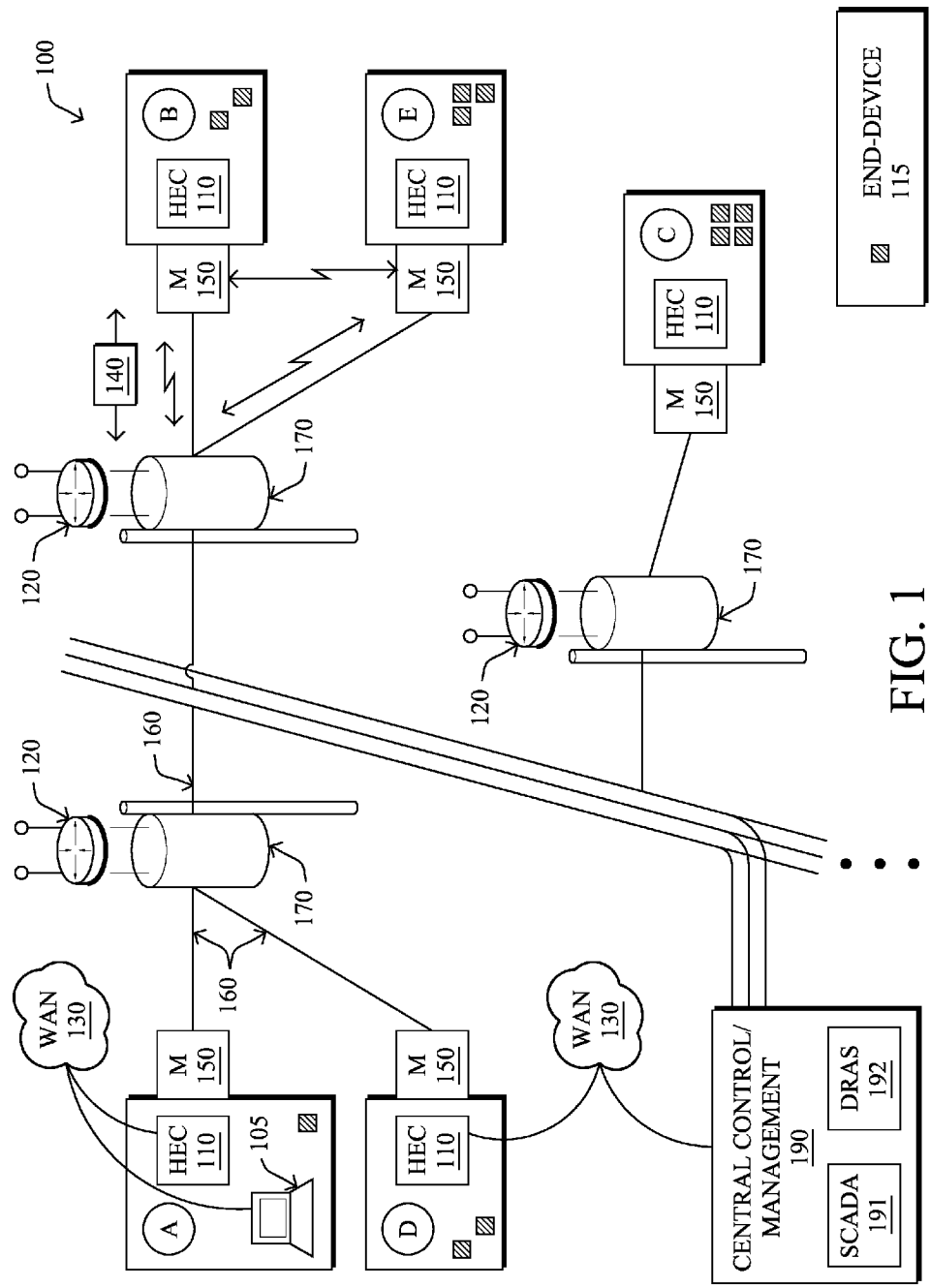
FIG. 1 illustrates an example network of devices in an electric grid shown with various communication and powering configurations.

According to one or more embodiments of the disclosure, a computer determines a grid topology of an electric grid based on one or more electric grid configuration description files, and also determines a network topology of a computer network used to provide communication to grid devices of the electric grid. By assessing whether the network topology is configured to meet one or more communication requirements of the grid topology (e.g., initially and/or through monitoring for grid changes), the computer may trigger a corrective action (e.g., alarm or reconfiguration) in response to the network topology not being configured to meet the one or more communication requirements of the grid topology.

Description

A computer network is a geographically distributed collection of nodes interconnected by communication links and segments for transporting data between end nodes, such as personal computers and workstations, or other devices, such as sensors, utility meters, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

Smart object networks, in particular, are a specific type of network having spatially distributed autonomous devices such as sensors, actuators, etc. For example, sensor/actuator networks, such as for "Smart Grid" and "Smart Cities" (e.g., for Advanced Metering Infrastructure or "AMI" applications, as well as grid control, generally), may cooperatively monitor and/or control physical or environmental conditions at different locations. For example, sensor networks may be used to monitor energy/power consumption, resource consumption, etc., while another type of smart object, actuators, may be responsible for turning on/off engine, opening/closing circuits, or perform any other actions. Generally, smart object networks may include any type of device that is able to communicate information on a computer network, such as household appliances (air conditioners, refrigerators, lights, etc.), industrial devices (heating, ventilating, and air conditioning (HVAC), pumps, motors, etc.), and other "smart" devices. Though not specifically discussed, those skilled in the art would recognize that this invention covers also objects which by themselves are not "smart" but by being integrated or connected via an adjunct proxy are able to communicate (convey information and receive control commands) with other smart elements of the network.

That is, smart object networks are typically interconnected by a communication network, such as a wireless network, though wired connections are also available, including, e.g., PLC communication. For instance, each smart device (node) in a smart object network may generally be equipped with a radio transceiver or other type of communication port, a microcontroller, and an energy source, such as a battery or a distribution grid power source. Typically, size and cost constraints on sensor nodes result in corresponding constraints on resources such as energy, memory, computational power and bandwidth.

FIG. 1 is a schematic block diagram of an example simplified network 100 of devices illustratively comprising various communicating and non-communicating devices. For example, power-lines 160 may bring electrical grid power from respective transformers 170 into homes/businesses/etc. to power one or more end-devices 115 (such as lights, heaters, air conditioners, refrigerators, computers, industrial machinery, some of which being intelligent end devices (IEDs)), generally via a meter 150. In addition, "pole-top" routers 120, such as field area routers (FARs), may communicate data packets 140 (e.g., traffic and/or messages) with other communicating nodes/devices of the network 100. For instance, the links between the devices may be wired links (e.g., for power-line communication "PLC" and/or Ethernet) or may comprise a wireless communication medium. An energy controller (e.g., home energy controller, "HEC") 110 or other energy controller may be present at certain locations, and may be in communication with the meters 150, pole-top routers 120, or else directly to another computer network, e.g., WAN 130, similar to conventional computers 105.

In addition, a centralized control center or management center 190 may be present in the network 100, such as at an electrical grid company's centralized location or substation, and may be in communication over power-lines 160 or via dedicated wireless, radio, IP, or optical network, and through WAN 130. Such a grid control device/system (also referred to as a Distribution Management System, or "DMS"), which may include a supervisory control and data acquisition (SCADA) device 191 or a substation computer, as well as one or more Demand Response automation servers (DRASs) 192 (also referred to as a Demand Response Management System or "DRMS") in certain embodiments, may be located within the network 100, and in communication with the intelligent end devices (IEDs) via illustrative FARs 120. Note that the SCADA 191 may also be configured to monitor and control one or more "grid control devices," such as various electro-mechanical devices (energy storage, capacitor banks, switches, distribution static compensators or "DSTAT-COMs," etc.) used to manage operability (e.g., balance, stability, power levels, etc.) within the underlying power grid of network 100. Note that while grid control devices may be co-located with SCADA 191, such devices may actually be located in a separate physical location and connected by a communication link, accordingly.

Notably, the communication components of network 100 may generally comprise a hybrid of communication modalities such as wireless mesh network, fiber network, PLC network, etc., or even a computer network such as the Internet. That is, the links between the devices may be wired links (e.g., for power-line communication or Ethernet communication), optical fiber network, or may comprise a wireless communication medium. Also, data packets 140 (e.g., traffic and/or messages sent between the devices/nodes) may be exchanged among the communicating nodes/devices of the computer network 100 using predefined network communication protocols such as certain known wired protocols, wireless protocols (e.g., IEEE Std. 802.15.4, WiFi, etc.), PLC protocols, or other shared-media protocols where appropriate. In this context, a protocol consists of a set of rules defining how the nodes interact with each other.

Furthermore, those skilled in the art will understand that any number of nodes, devices, links, etc., as well as any different (and suitable) type of nodes, devices, links, etc., may be present in the network, and that the view shown herein is for simplicity and is not meant to limit the scope of the embodiments herein. In fact, those skilled in the art will appreciate that countless arrangements of power grid components and communicating devices may be established.

As noted above, electric power is generally transmitted from generation plants to end consumers (industries, commercial, residential, etc.) via a transmission and distribution grid consisting of a network of power stations and substations interconnected by transmission circuits/power lines. From the transmission grid, power may then be distributed to end consumers via a distribution system. Once at the end consumers, electricity can be used to power any number of devices, such as end-devices 115.

Figure 2A:
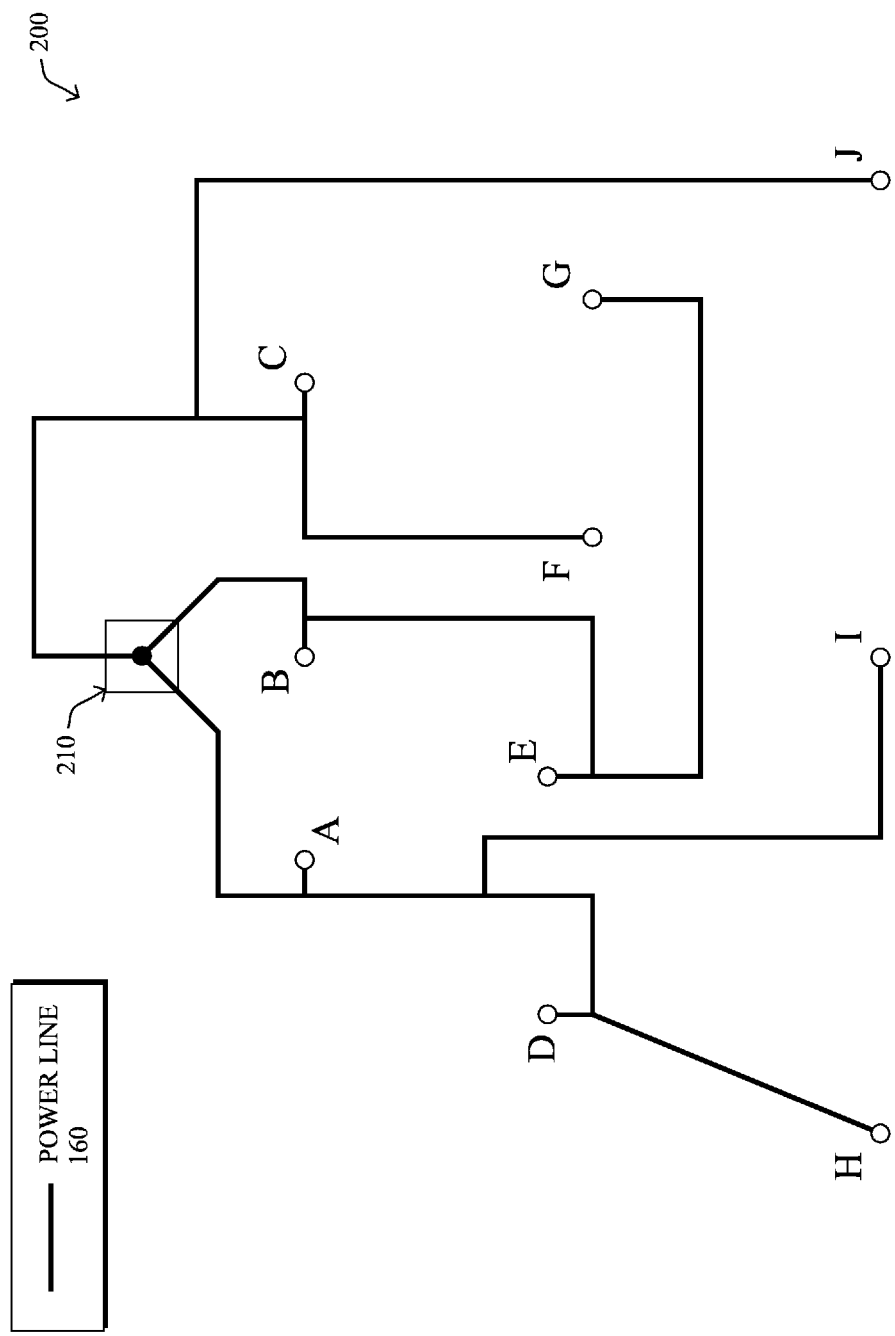
FIG. 2A illustrates an example electric distribution system.

FIG. 2A illustrates a vastly simplified view of an example electric power transmission and distribution grid 200 to the example devices of FIG. 1, above. For instance, a distribution substation or a transformer 210 supplies electricity over a plurality of power lines 160 to the devices at locations "A" through "J". In particular, the transfer of alternating-current (AC) electric power to the end users most frequently takes the form of poly-phase electric power, where, e.g., three voltage waveforms are produced that are generally equal in magnitude and 120° out of phase to each other. Each phase may generally be used to power entire buildings, neighborhoods, etc., and may also supply power to many (e.g., tens, hundreds, thousands) of devices within those establishments. For smaller customers (e.g., households) usually a single phase is taken to the property. For larger installations (commercial buildings and industrial facilities), all three phases may be taken to a distribution panel, from which both single and multi (two- or three-phase) circuits may be fed.

Figure 2B:
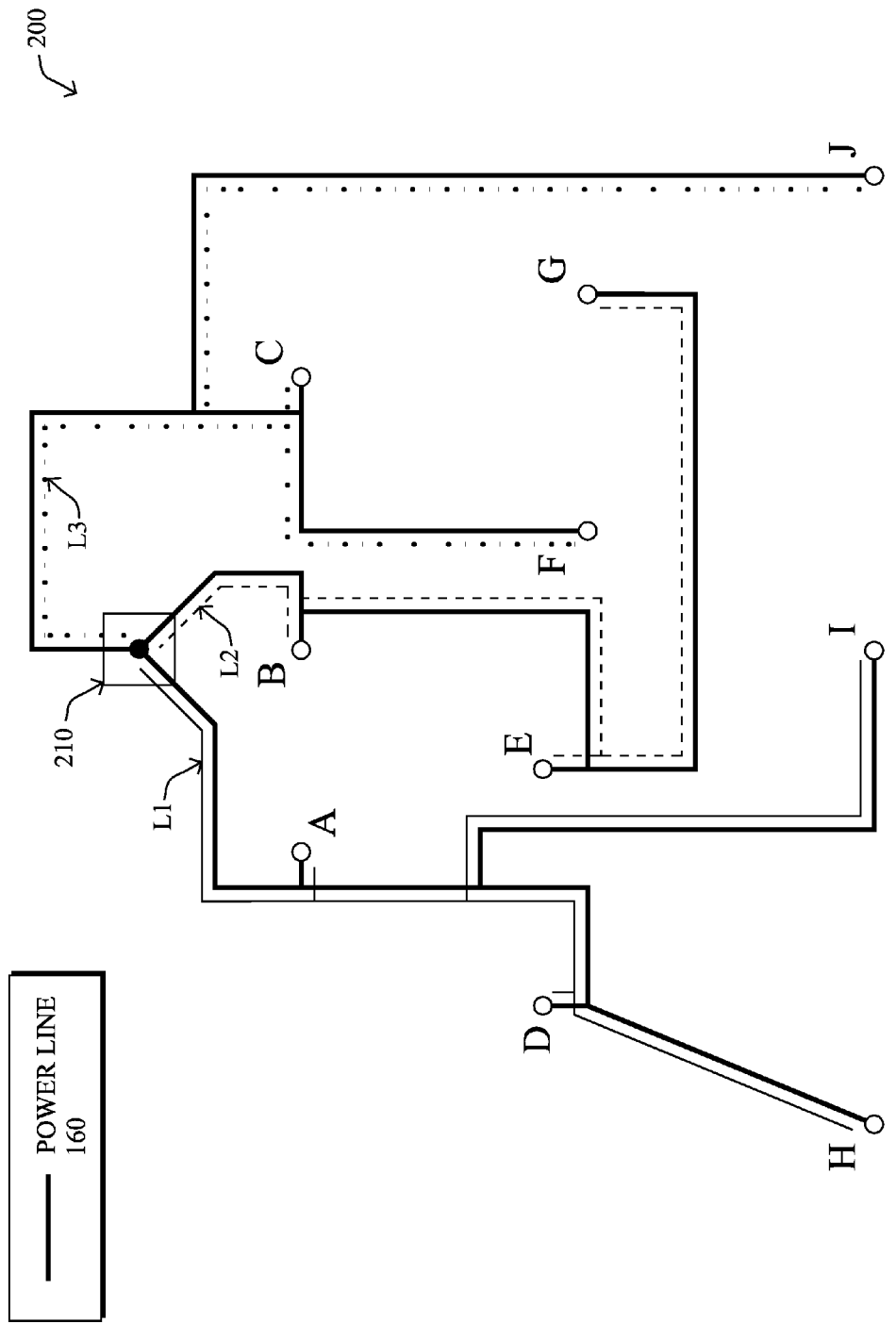
FIG. 2B illustrates an example poly-phase electric distribution of the system shown in FIG. 2A.

As shown in FIG. 2B, therefore, electrical power of three phases, L1, L2, and L3, is supplied to the locations A-J (a neutral/ground may be shared by the phases). If the load on a three-phase system is balanced equally (enough) among the phases, little or no current flows through a neutral point, which is an important design aspect of the electric grid, allowing for efficient use of transformer capacity, reduced materials (e.g., size of a neutral conductor to handle imbalance), etc. However, there are many factors that may create imbalance and/or instability between the phases, such as unequal loads, excess load usage, faults, downed power-lines, etc., the stabilization of which being particular emphasized due to the recent evolution of the dynamic distribution grid.

The basic mathematical object that describes an AC power system waveform (current of voltage) is the "phasor" (phase angle vector). Phasors represent constant frequency sinusoids as vectors in either polar (magnitude and phase angle) or complex (real and imaginary) form. It is possible and common to perform AC circuit calculations using phasors, such as through the use of phasor measurement units (PMUs). In three-phase systems, for instance, phasors necessarily come in threes, and may be balanced (all three phases have equal magnitude and the inter-phasor angles are uniform at 120 degrees each), or unbalanced (not all amplitudes are equal and/or inter-phasor angles are not all 120 degrees).

Figure 3B:
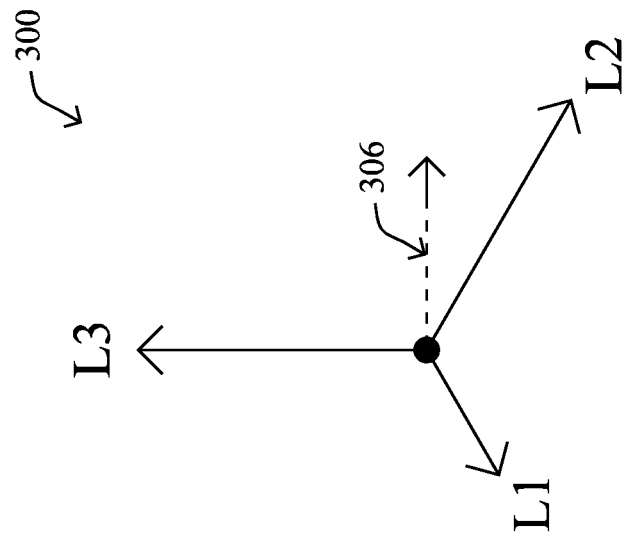
FIGS. 3A-B illustrate example phase representations of the poly-phase electric distribution system.
Figure 3A:
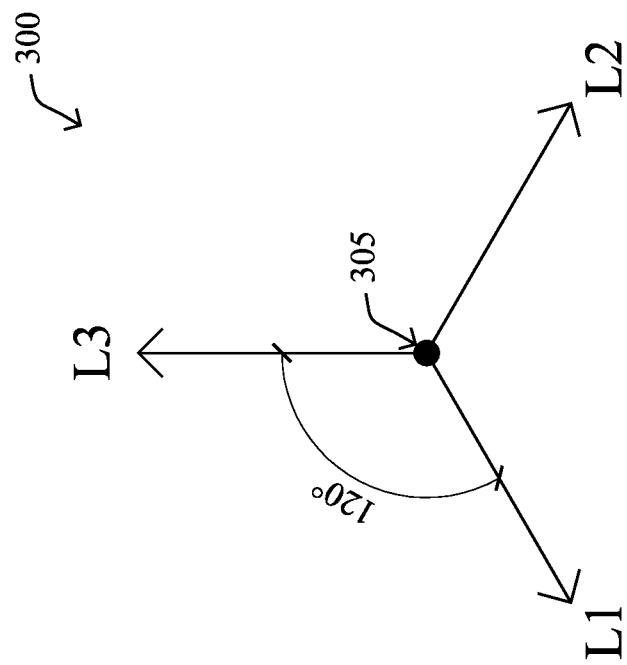

FIG. 3A illustrates an example phase representation 300 of the distribution grid's electrical power. In particular, three waveforms are illustratively produced (L1, L2, and L3) that are generally equal in magnitude and approximately 120° out of phase to each other. The currents returning from the end users to the supply transformer all share the neutral wire (neutral point 305). If the loads are evenly distributed on all three phases, as they are in FIG. 3A, the sum of the returning currents in the neutral wire is zero. Any unbalanced phase loading such as in FIG. 3B, however, may result in a current 306 at the neutral point (e.g., a harmonic distortion in the current), which may cause inefficient use of transformers, or other problems, including (but not limited to) brown-outs or black-outs in extreme cases. (Note that generally, overload of the neutral is a more frequent occurrence, resulting in heating of the neutral, since normally, the substation relay on that circuit should detect negative sequence or zero sequence over-current and trip long before any impact on generators is felt.) There are many factors that may create imbalance between the phases, such as excess load usage, downed power lines, etc.

Though the topology of the electric distribution grid typically considers the approximate balancing of the three-phase system, and other stabilization factors of the distribution grid in general, various factors, such as physical events and/or the dynamic nature of energy utilization in general, may result in imbalance and/or destabilization of the grid. At the present time, the uses for synchrophasor measurement include:

1. Real time monitoring and control—early indication of grid problems, instability, inter-area oscillation, voltage instability (e.g., operator decision support).
2. State determination—based on greater measurement and less estimation; boundary state for Regional Transmission Organization (RTO)/Independent System Operator (ISO) applications; WAMS (Wide Area Measurement System, or alternatively, Wide Area Management Services).
3. Regional transmission congestion management—to operate the grid according to true dynamic limits.
4. Post-disturbance analysis—orders of magnitude time savings in diagnosing events; also expedites power restoration.
5. Benchmarking system models, validation, fine-tuning—improved parameter values support better flow models.
6. Power system restoration—reduced risk of unsuccessful reclosings.
7. Protection and Control for distributed generation—precise islanding, microgrid operations, synchronization.
8. Multi-terminal transmission line protection.
9. Directional and distance relaying; fault impedance relaying.
10. Overload monitoring and dynamic rating (real time line impedance).
11. Adaptive protection—improve relay algorithms by making them adjust to real time conditions.
12. Real time automated control—automated prevention of angular and voltage stability problems, reduced low frequency oscillations (modal power oscillation damping); nonlinear flexible AC transmission systems (FACTS) control for grid stability (static VAR compensators or "SVCs," static compensators or "STATCOMs," Dynamic Voltage Restorers or "DVRs," United Power Flow converters or "UPFCs," etc.).
13. System integrity protection schemes—early and accurate determination of when power system is headed into instability.
14. Distribution level stabilization via distribution static compensators (DSTATCOMs).
15. Distribution level pre-fault analysis.
16. Distribution level fault detection/classification/location.
17. Dynamic power grid asset rating and utilization optimization.

Other applications will continue to be developed as PMU data becomes available to system operators and distribution engineers.

In addition, it is important to note that consumption patterns have changed in recent times due to acquisition of new consuming devices such as large flat panel TVs, electric cars, etc., which have introduced new loads to the distribution grid. It is well known that the load presented by customers varies as a function of the time, date, temperature, etc. Additionally, however, distribution grid loads have further evolved from a relatively static/predictable pattern to an even more dynamic one (e.g., due to intermittent supply from distributed energy resources (DERs), introduction of electric cars, etc.).

For one technique to counteract variances in load, a Demand Response (DR) system is a smart grid application mechanism designed to reduce power consumption, e.g., during peak hours. A utility or a service provider (e.g., SCADA 191, or more particularly a DRAS/DRMS 192) may issue a DR request to its customers asking them to turn off non-critical devices 115 when power demand may exceed supply or when utilities may need to purchase power at a higher cost than the rate they are allowed to charge. Since utilities continuously balance energy demand with supply, DR can be viewed as complementary to energy generation and transmission capacity, as it provides utilities with a manner to control energy demand and bring it in line with the available power.

As noted above, the Common Information Model (CIM) is an IEC standard which facilitates and simplifies information exchange (such as configuration, topology, status of an electrical network, etc.) amongst various applications. The standard utilizes a UML model to define a common vocabulary and basic ontology for aspects of the electric power industry. The central package within the CIM is the "wires model" which describes the basic components used to transport electricity. The CIM can be used to derive "design artifacts" as needed for the integration of related application software (e.g., XML Schema, RDF Schema).

The standard that defines the core packages of the CIM is IEC 61970-301, with a focus on the needs of electricity transmission, where related applications include energy management systems, SCADA, planning and optimization. The IEC 61970-501 and 61970-452 standards define an XML format for network model exchanges using RDF. The IEC 61968 series of standards extend the CIM to meet the needs of electrical distribution, where related applications include distribution management systems, outage management systems, planning, metering, work management, geographic information systems, asset management, customer information systems and enterprise resource planning. Inside substations, a more detailed model called IEC 61850 is adapted. This model (standard) is used for grid visualization, planning, operations and simulations.

Similarly, Substation Configuration Description Language (SCL) is the language and representation format specified by IEC 61850 for the configuration of electrical substation devices. This includes representation of modeled data and communication services specified by IEC 61850-7-X standard documents. The complete SCL representation and its details are specified in the IEC 61850-6 standard document. It includes data representation for substation device entities; its associated functions are represented as logical nodes, communication systems and capabilities. The complete representation of data as SCL enhances the ability of the different devices of a substation to exchange SCL files and to have complete interoperability.

Utility System vendors have developed various CIM visualization tools and integrated them with their own applications. For example, the following vendors have created CIM based tools (in brackets): Areva T&D (e-Terras), Siemens T&D (PTI), ABB (Spider), CESI (SPIRA), DIgSILENT (PowerFactory), SISCO (UIB), and PowerInfo (CIMSpy). However, because CIM and SCL provide only limited communication architecture support, and since the abovementioned utility system companies are not IP networking centric, existing tools are primarily for visualization, and do not support any IP network configuration or provisioning.

The Cisco Substation Configuration Tool (CSCT), developed by Cisco Systems, Inc. of San Jose, Calif., provides for XML viewing through reading the substation configuration descriptor file and displays the topology of the electric grid. Additionally, the tool integrates and displays the topology of the IP network connectivity over which the applications and electric IEDs communicate. In addition to supporting visualization, according to the techniques described herein, the illustrative tool will be enhanced to also include topology analytics to provide for automated network configuration.

Managing Integrated Network and Grid Topologies

The techniques herein allow a topology visualization application, such as the illustrative CSCT application noted above, to evolve into a broader role in managing grid operation by automatically configuring various aspects of the corresponding IP network to match the dynamic topology of the electric grid. In particular, a system in accordance with the techniques herein integrates IP networking knowledge with the UML description of the electric grid topology to provide an easy-to-use tool for engineers and system operators to visualize the substation's IP network topology along with the electric grid topology. Moreover, the tool also analyzes the two topologies and ensures that the IP network topology matches the dynamic (varying) topology of the electric grid, such as by automatically modifying the network topology, accordingly.

Specifically, according to one or more embodiments of the disclosure as described in detail below, a computer (e.g., at management location 190) determines a grid topology of an electric grid based on one or more electric grid configuration description files, and also determines a network topology of a computer network used to provide communication to grid devices of the electric grid. It should be noted that the information regarding the smart grid topology may be further enhanced via real-time measurements of the state of various LEDs via the communication network. By assessing whether the communication network topology is configured to meet one or more communication requirements of the grid topology (e.g., initially and/or through monitoring for grid changes), the computer may trigger a corrective action (e.g., alarm or reconfiguration) in response to the network topology not being configured to meet the one or more communication requirements of the grid topology.

Figure 4:
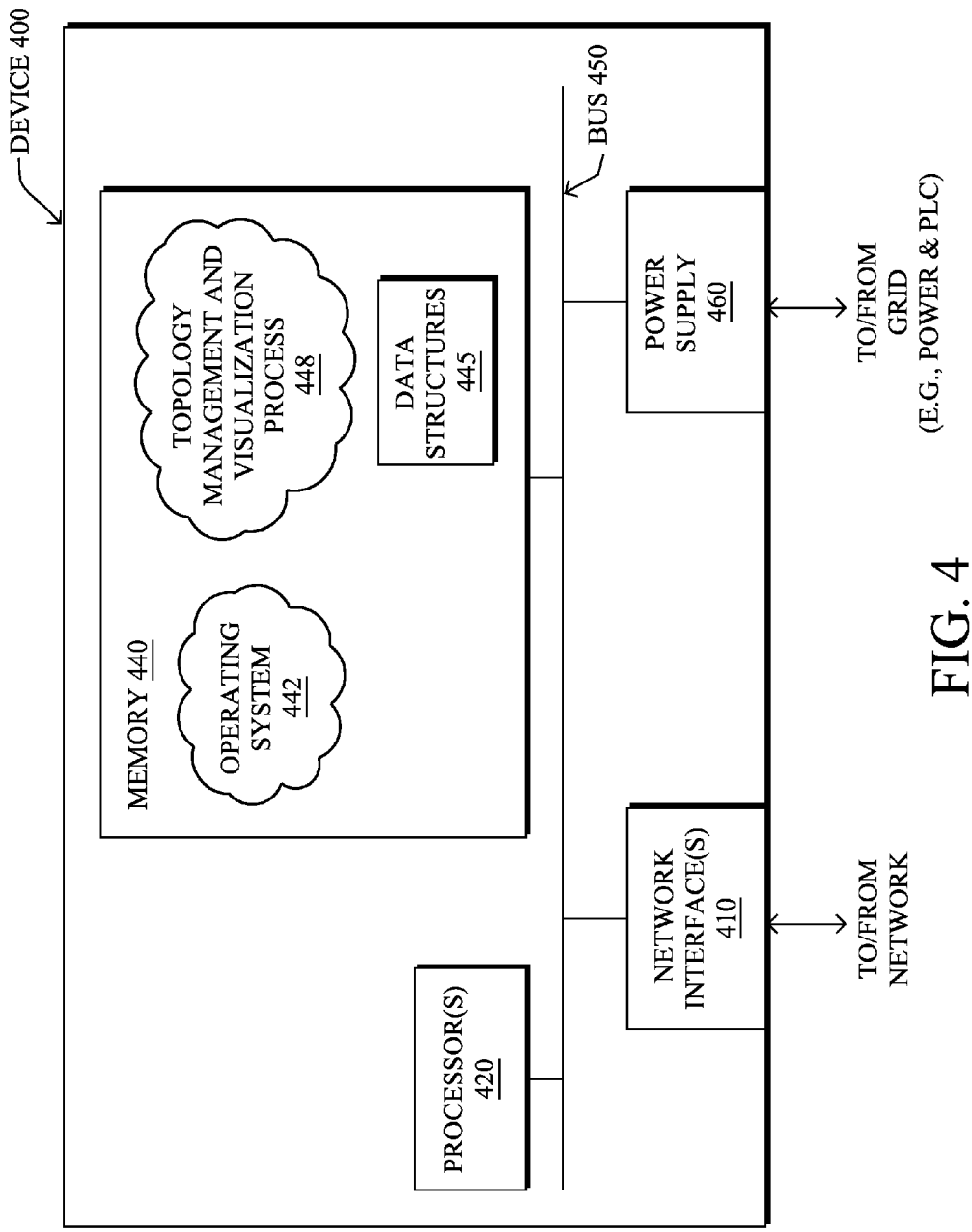
FIG. 4 illustrates an example simplified computer/management device.

FIG. 4 is a simplified schematic block diagram of an example device 400 that may be used with one or more embodiments described herein, e.g., as an appropriately configured management/computation device, such as a head-end device (or application) within the central management center 190, a network management server (NMS), or other suitable device. The device 400 may comprise a network interface 410, a processor 420, and a memory 440 interconnected by a system bus 450. Notably, the device may also be powered by a power supply 460 attached to the power grid (power-line 160).

The network interface 410 contains the mechanical, electrical, and signaling circuitry for communicating data over physical and/or wireless links coupled to the network 100. The network interface may be configured to transmit and/or receive data using a variety of different communication protocols, including, inter alia, various wired or wireless protocols, powerline communication (PLC) protocols, broadband over power lines (BPL), etc.

The memory 440 comprises a plurality of storage locations that are addressable by the processor 420 for storing software programs and data structures associated with the embodiments described herein. The processor 420 may comprise necessary elements or logic adapted to execute the software programs and manipulate the data structures 445, such as description (or descriptor) files, e.g., UML files/models, described herein. An operating system 442, portions of which are typically resident in memory 440 and executed by the processor, functionally organizes the device by, inter alia, invoking operations in support of software processes and/or services executing on the device. These software processes and/or services may comprise an illustrative topology management and visualization process 448, for use as described herein, as well as other processes not shown for clarity.

Topology management and visualization process 448 may contain computer executable instructions executed by the processor 420 to perform functions relating to the novel techniques described herein. For example, the techniques herein may be treated as extensions to the visualization tools (e.g., the illustrative CSCT application), and as such, may be processed by similar components understood in the art that execute those protocols, accordingly. Also, while the techniques herein generally describe the topology management and visualization process 448 being on a standalone computer/device attached to the network 100, the process may be integrated it into a device, such as an NMS, that combines network management with grid device management.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Figure 5:
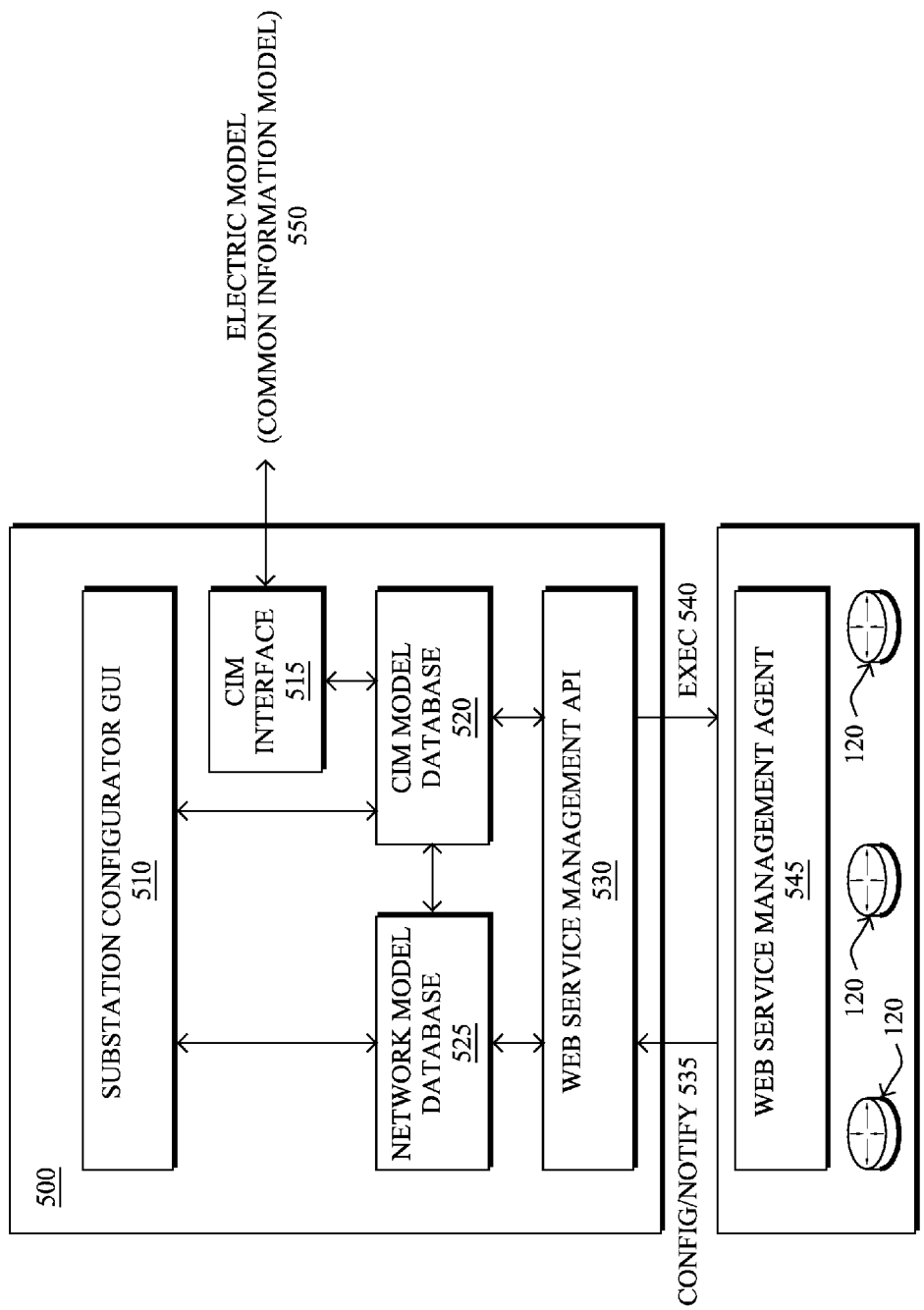
FIG. 5 illustrates an alternative example view of the simplified computer/management device.

For example, FIG. 5 illustrates an alternate view of device 400 as a simplified logical/software model 500 that may perform one or more techniques described herein, e.g., a more detailed view of the topology management and visualization process 448. In particular, the device 500 (i.e., 400) comprises an illustrative substation configurator graphical user interface (GUI) module 510 to visually display the topologies discussed herein, and to receive input from a user regarding various manual configurations. For instance, by receiving electric model (CIM files) 550 at a CIM interface 515, a CIM model database 520 may provide topology information to the GUI 510. In addition, a communication network model database 525 may provide information to the GUI 510 that it receives via an illustrative web service management API 530, which may receive configuration information and notifications 535 from a web service management agent (e.g., operating on the FARs or other network devices 120), and which may also send executable commands 540 to the communication network devices, as described herein.

The web service management logic accesses the CIM and communication model databases and analyzes them as discussed below. In case the module determines that the communication network is not optimally configured to serve the needs of the electric network, the system may issue alerts and/or in one specific embodiment, automatically corrects the configuration of the communication network.

Figure 6:
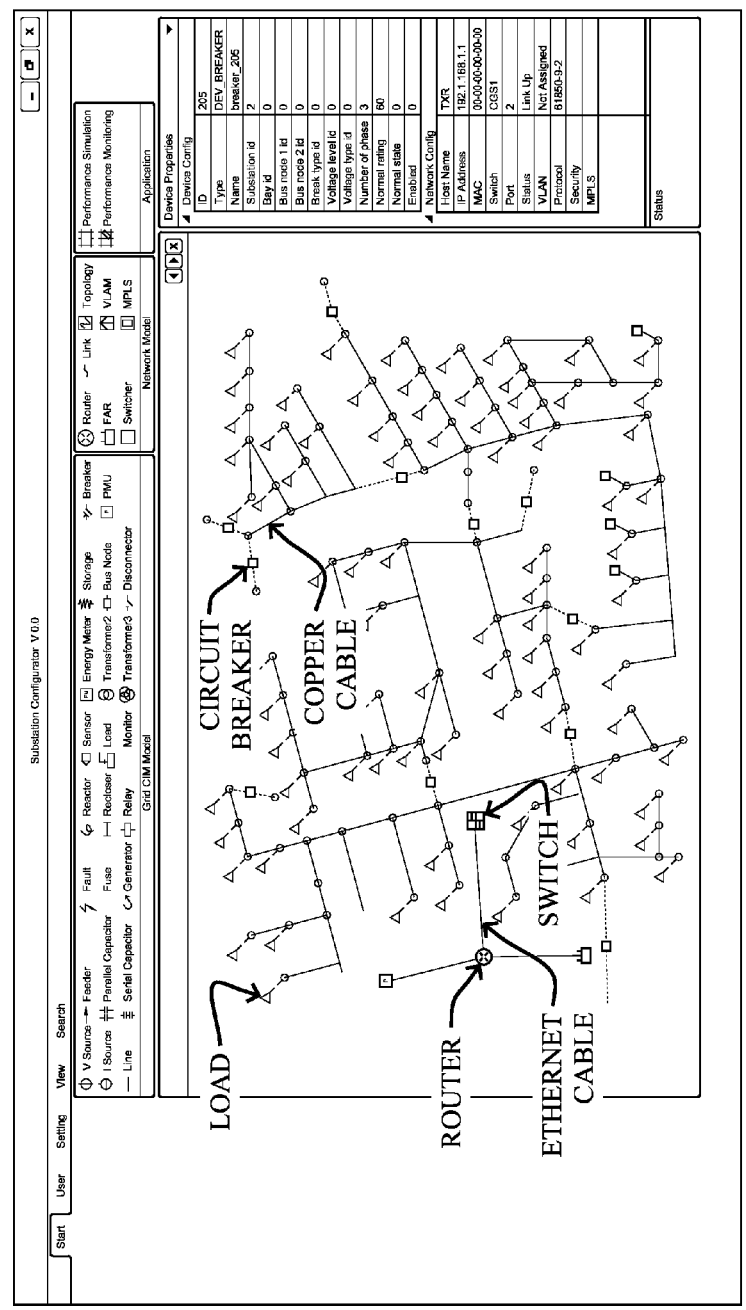
FIG. 6 illustrates an example grid and network visualization.

Regarding the GUI 510, those skilled in the art will understand how to generally convert CIM models into graphical representations based on location and connectivity of the various devices of the network 100. Additionally, as described herein, the GUI visualization not only provides for the electrical grid topology, but also the network topology, as well as control over the communication network topology configuration. FIG. 6 illustrates an example GUI visualization 600 of an integrated electric grid topology and network topology, showing various network devices (e.g., routers, switches, Ethernet cables, etc.) and grid devices (e.g., circuit breakers, capacitor banks, loads, and copper cable). Various functionalities may be available to a user of the GUI 600, such as inspecting the topology details, or even manually configuring certain aspects (e.g., network configuration, circuit breaker functionality, recloser circuits, normally open points, etc.).

Operationally, according to one or more embodiments herein, the system provides a secure communication channel between the topology management and visualization process 448 (device 400/500) and the servers or devices that contain or otherwise control configuration information in the network 100. For instance, the CIM interface 515 communicates with a centralized CIM server (not shown), or else locally stores the information, while the web service management API 530 (e.g., network interfaces), communicates with administration ports of the routers and switches in the electric grid (e.g., in the substation). Notably, security in certain environments may be a critical concern, such as where the power assets may be Critical Assets, and where the communications and equipment associated with them may be Critical Cyber Assets, for instance, triggering requirements for North American Electric Reliability Corporation (NERC) Critical Infrastructure Protection (CIP) compliance, as will be understood by those skilled in the art. Accordingly, the secure channel may illustratively include a complete audit trail and secure access requiring a two factor authentication.

Through the secure communication, the system may determine a grid topology of an electric grid based on one or more electric grid configuration description files (e.g., UML files), such as a CIM model or SCL model. In addition to traditional electric grid topology construction, the system according to the techniques herein also determines a network topology of the computer network used to provide communication to devices of the electric grid. As an illustration, assume a substation with a specific grid topology utilizes an IP network for monitoring and managing purposes. To provide optimal operations, the IP network topology may be configured to be aligned with the electric grid topology. Specifically, in one embodiment, virtual local area networks (VLANs) may be configured to optimize communication amongst the various Intelligent Electronic Devices (LEDs) and smart grid applications (e.g., grid controllers, phasor measurement units (PMUs), sensors, etc.).

To this end, multiple VLANs may be configured to monitor and control the various feeders and grid segments. In accordance with the techniques herein, the visualization tool is enhanced to simplify the configuration of the VLANs and to ensure optimal IP network configuration in face of time-varying grid topology. Rather than configuring the VLANs using the existing command line interface (CLI), e.g., the detailed language of routers and switches, a system in accordance with the techniques herein allow the utilization of the user-friendly screens of the GUI 600 to accomplish this functionality. The paragraphs below describe multiple modes of operations of the system.

Figure 7A:
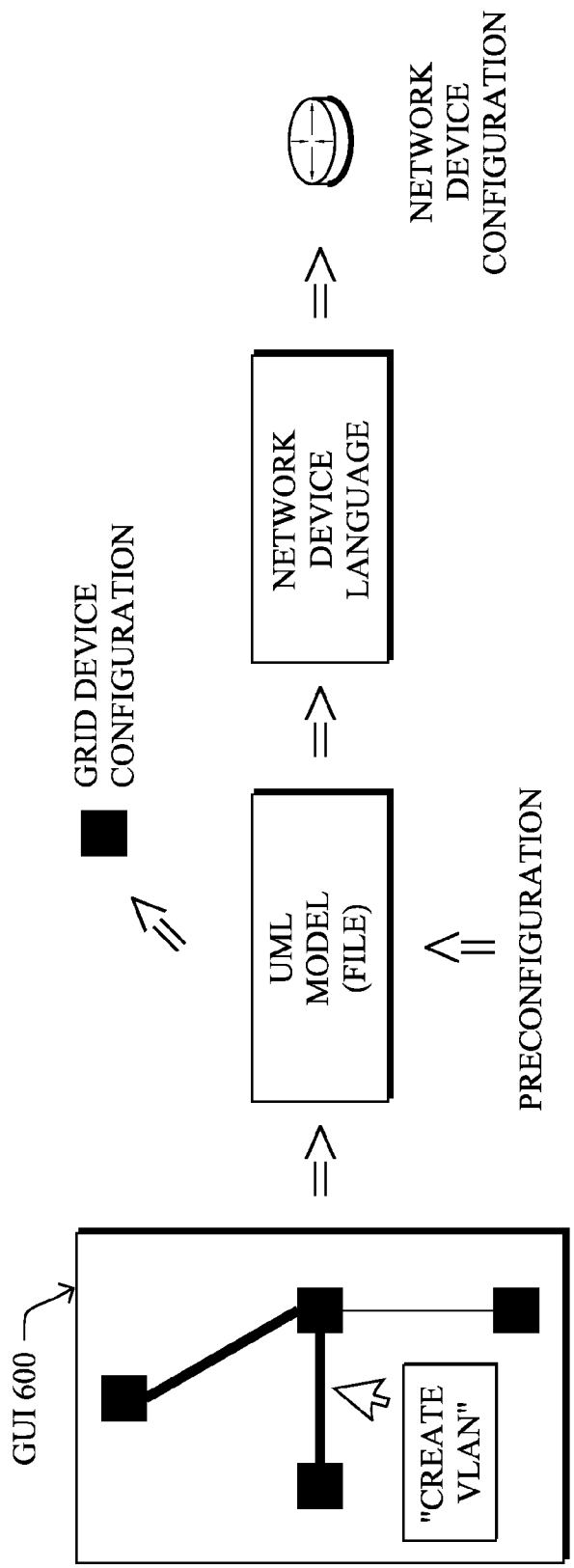
FIGS. 7A-7B illustrate example network determination techniques through translations.

In accordance with a first mode of operation, an administrator uses the on-line diagram (the grid topology diagram), i.e., GUI 600 that cooperatively illustrates the grid topology and network topology, and selects (highlights) the LEDs or other grid devices which need to reside on the same VLAN. For example, FIG. 7A illustrates a greatly simplified GUI representation of this, where the administrator "clicks" on the devices and selects an illustrative "create VLAN" option. In response to receiving the graphically based configuration commands to configure one or more corresponding grid devices, the tool (process 448) creates a UML (an XML descriptor) of a VLAN which ties together all of the selected (e.g., highlighted) devices. The tool then translates this UML descriptor into a set of batch command line instructions (corresponding network device commands) which interact with the routers to configure the network topology and create the desired VLAN.

In accordance with another mode of operation, also illustrated in FIG. 7A, VLAN configuration may be determined from UML files. For instance, new substations may be planned offline, and as part of the planning process a UML description file of the desired VLANs may be created. In accordance with this embodiment, the UML description of the planned VLANs (in support communication amongst specific LEDs) are pre-defined (e.g., as part of the process of engineering the said substation). In response to receiving such device configuration description files in accordance with the techniques herein, the tool (process 448) consumes the UML file, translates it into router and switch command lines (corresponding network device commands) and configures the network accordingly.

Figure 7B:
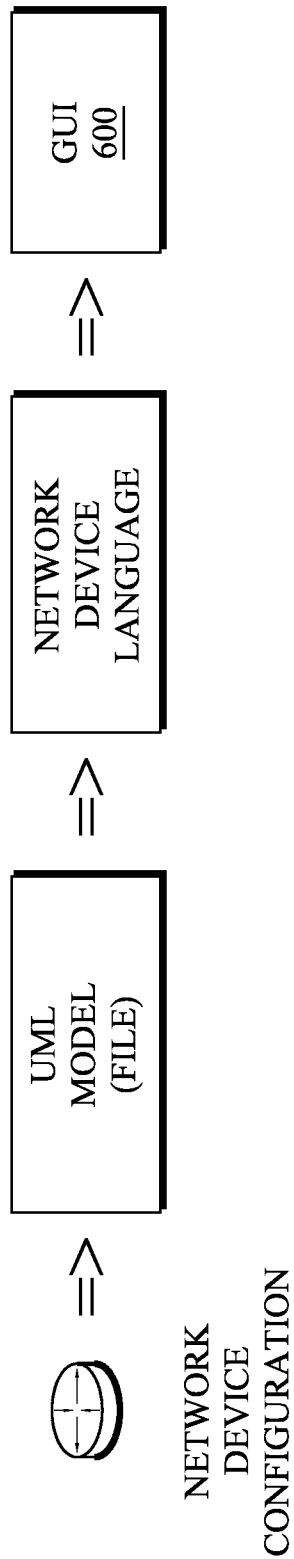

In a third mode of operation, determining the network topology is based on discovering configurations of devices already operating in the network, such that the system automatically reads the configuration of the routers and switches and constructs a UML description of the IP network topology (including multiple VLANs), as shown in FIG. 7B. For instance, in accordance with this aspect of the techniques herein, the system may be used in existing substations wherein the IP network has already been configured. To this end, when the tool/application is installed in an existing and operational substation, it establishes a secure IP connection with the administrator port of the routers and switches in the substation and reads the configurations of the routers and switches in the substation. The process 448 then analyzes the configurations and translates them into a UML description of the IP network topology. This topology is then made available to the network operator by displaying it on the GUI screen 600.

In accordance with the embodiments herein, regardless of the mode of operation mentioned above, the process 448 overlays the IP topology on top of the grid topology and invokes an analytics module to assess and verify that the network topology (e.g., IP VLAN topology) matches the electric grid topology (communication requirements). Examples of communication requirements of the grid topology comprise, among others, providing communication between all the devices of the electric grid, providing isolated communication within one or more specific subsets of all the devices of the electric grid, preventing communication between two or more specific subsets of all the devices of the electric grid, providing redundant communication between two or more specific subsets of all the devices of the electric grid, providing a specific Quality of Service (QoS) for the communication, etc.

Figures 8A, 8B:
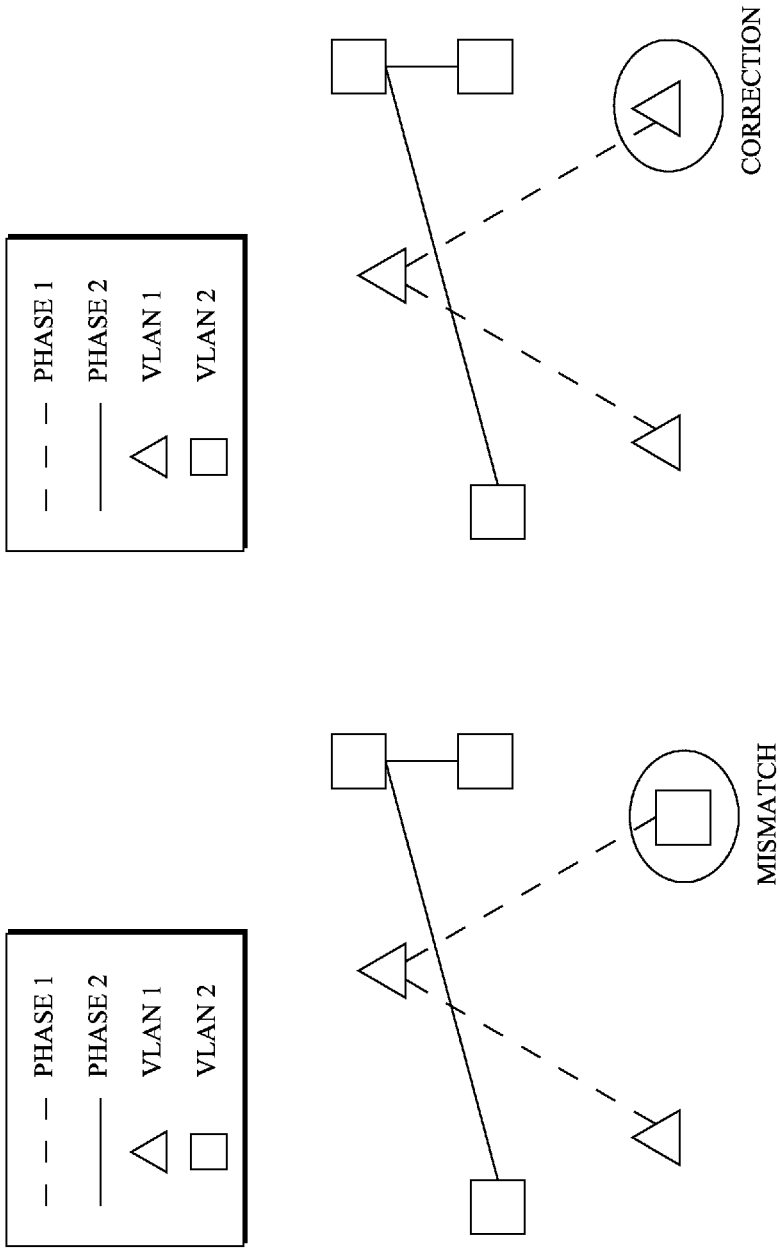
FIGS. 8A-8B illustrate an example of corrective network reconfiguration.

In case a mismatch is found, i.e., in response to the network topology not being configured to meet the one or more communication requirements of the grid topology, a corrective action is triggered, such as either raising an alarm to alert a system administrator or alternatively, automatically correcting the mismatch by reconfiguring some elements of the network topology. For example, as shown in FIG. 8A, assume that a simple requirement is that grid devices of a same phase (represented as dashed and solid lines) are configured within a same VLAN. If the VLAN configuration of the devices, shown as triangle devices in a first VLAN and square devices in a second VLAN, do not match that description (as shown by the circled device), then as shown in FIG. 8B, the correction (e.g., automatic or by a system administrator) of the misconfiguration may result in reconfiguration of the network topology to include the mismatched square device in the triangle device VLAN.

Furthermore, according to one or more embodiments herein, the network topology may also be adaptively reconfigured to meet the one or more communication requirements of the grid topology in response to identifying a change in the grid topology. For example, as shown in FIG. 9A, assume that the underlying grid topology of FIG. 8B has been changed in response to a Fault Location Isolation and Restoration (FLIR) event. According to this change (e.g., a recloser, circuit breaker, manual "truck roll" rewiring, etc. to isolate the faulty grid segment and to restore electricity to some of the affected grid segments) an illustrative one of the square VLAN devices has been shifted to a new phase. As a result, the IP network which was optimized for the pre-FLIR grid topology of FIG. 8B may not be optimally configured to handle the communication needs of the new grid topology in FIG. 9A. In accordance with the techniques herein, therefore, the system, through continual monitoring for changes in the topology, identifies the FLIR event, determines the new grid topology, recognizes the discrepancy between the actual communication network configuration and the new needs of the network, and triggers corrective action, such as notifying an administrator or automatically reconfiguring the IP network VLANs as to optimally accommodate the new electric grid topology. For instance, as shown in FIG. 9B, the affected square device has been reconfigured as a triangle VLAN device, accordingly.

The techniques herein thus address connectivity between the substation-level communication devices with the power grid topology. As an example, as noted above, PMUs may be used to calculate phasors from power waveforms. Because phase angle is a relative quantity, it is necessary when combining phasors taken from different parts of a power grid to align the phase angle elements to a common phase reference. By aligning the PMU communication to a particular network topology, such as by having same-phased PMUs on a shared VLAN, coordination between PMUs may thus be optimized. In addition, since controlling peak energy demand/consumption is beneficial to both utilities and to consumers, Demand Response (DR) systems may be used to reduce power consumption, e.g., during peak hours. That is, a utility or a service provider may issue a DR request to its customers asking them to turn off non-critical devices when power demand may exceed supply or when utilities may need to purchase power at a higher cost than the rate they are allowed to charge. By aligning DRAS devices 192 with particular phases or sets of devices (e.g., high consumption devices, low priority devices, etc.) through the use of network configuration, the DR requests may be optimally transmitted to the desired sets of devices, accordingly. Other example uses of the techniques herein may also be established, and those mentioned herein are merely illustrations.

Additionally, in accordance with certain embodiments herein, the techniques may also allow for the utilization of the determined grid topology and network topology in an offline simulation. That is, another embodiment herein may allow for the creation of a partitioned instance for using real configuration information in a simulation for training and modeling, e.g., for "what if" scenarios. Such modeling may illustratively include modeling of performance, functionality, and recovery from a variety of error conditions and disaster scenarios.

Figure 10:
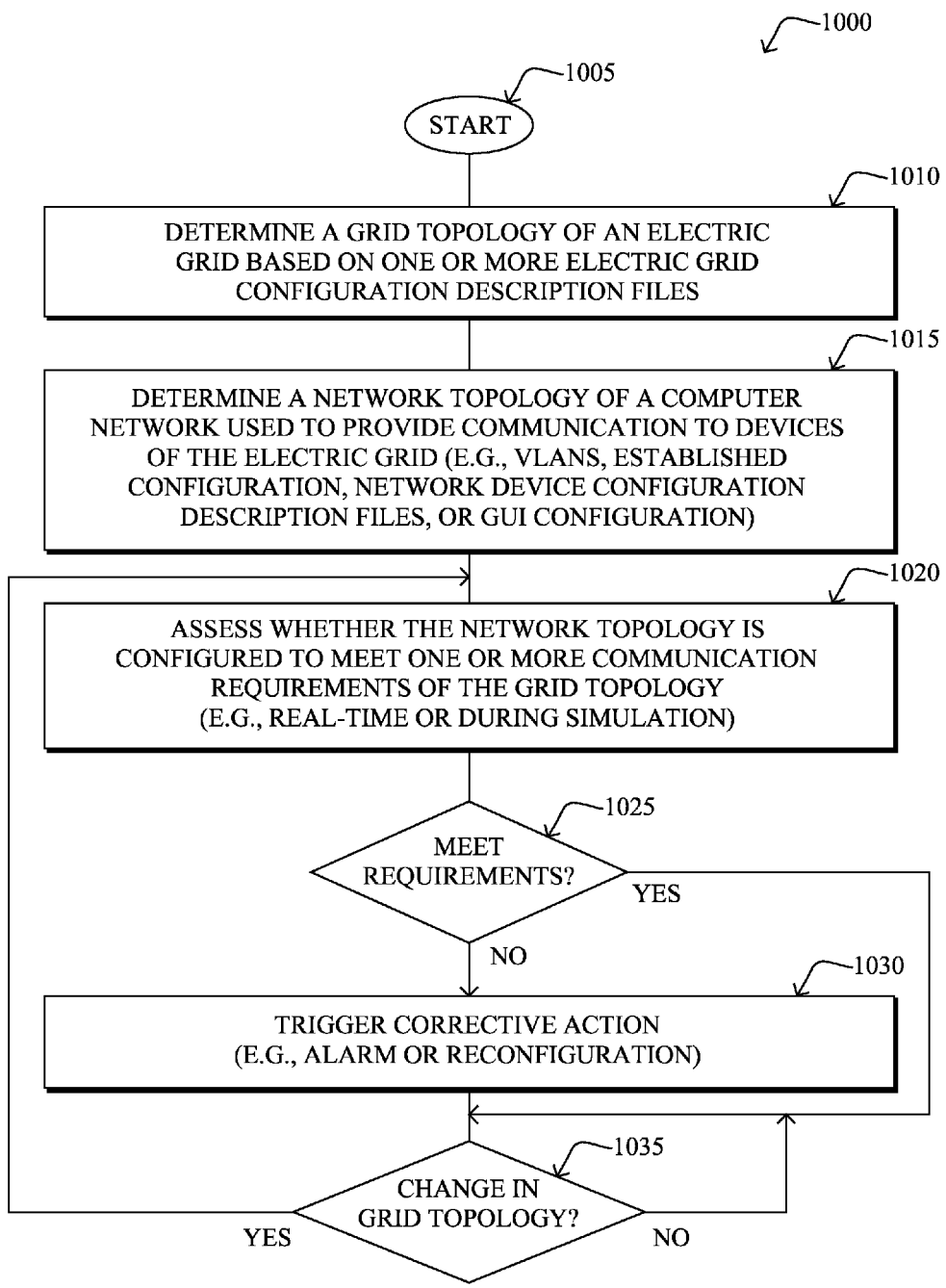
FIG. 10 illustrates an example simplified procedure for management of communication network topology based on an associated electric grid topology.

FIG. 10 illustrates an example simplified procedure for management of communication network topology based on an associated electric grid topology in accordance with one or more embodiments described herein. The procedure 1000 starts at step 1005, and continues to step 1010, where, as described in greater detail above, the system (computer 400, generally) determines a grid topology of an electric grid based on one or more electric grid configuration description files and/or real-time information read from electric network IEDs. In addition, in step 1015, it also determines a network topology of a computer network used to provide communication to devices of the electric grid. For instance, as mentioned above, the network topology may specifically be VLAN configuration, and/or may be based on an established configuration (pre-existing network), network device configuration description files, or GUI configuration).

Based on both topologies, in step 1020 the system assesses whether the network topology is configured to meet one or more communication requirements of the grid topology (e.g., in real-time or during a simulation). In the event that certain requirements are not met in step 1025, such as due to VLAN misconfiguration, then corrective action (e.g., an alarm or an appropriate reconfiguration) may be triggered in step 1030. Once the network topology meets the requirements, whether due to the corrective action in step 1030 or in response to having originally met the requirements in step 1025, then in step 1035 the system may monitor for any changes to the grid topology, such as through FLIR events. In the event of a change, then the procedure 1000 returns to step 1020 to reassess whether the requirements are still met, in order to trigger any necessary corrective action, accordingly.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. For example, though the procedure 1000 shows a return to step 1020 in response to changes in the grid topology, changes may also occur in the network topology (e.g., manually or in response to network failure), and as such, the procedure may jump to step 1015. Also, one or more of the requirements may change, and the procedure may assess the topology arrangements in response to the new requirements in step 1020. Again, the sequence shown in FIG. 10 is merely a representative and simplified example procedure.

The novel techniques described herein, therefore, provide for management of communication network topology based on an associated electric grid topology. In particular, the techniques herein integrate IP networking with electric grid topology within a single tool for engineers and system operators to visualize the network (e.g., the substation VLAN topology) along with the electric grid topology. In addition, the tool analyzes the two topologies and ensures that the IP network topology is automatically modified to match the dynamic (varying) topology of the electric grid. That is, the techniques above provide functionality that would be difficult, if not practically impossible, to perform manually, such as the adaptive network reconfiguration or even configuration confirmation for large scale deployments.

In other words, the techniques herein enhance mere visualization tools to provide network configuration, particularly comparing VPN/network topology with grid topology, and recognizing misconfigurations/misalignment which may be potential faults or security issues. This is especially important as more and more power engineers may be required to perform network configuration.

While there have been shown and described illustrative embodiments that provide for management of communication network topology based on an associated electric grid topology, it is to be understood that various other adaptations and modifications may be made within the spirit and scope of the embodiments herein. For example, the embodiments have been shown and described herein with relation to electric grid topology. However, the embodiments in their broader sense are not as limited, and may, in fact, be used with other types of physical topologies and corresponding communication networks, such as other utilities (water, gas, etc.), other types of networks (e.g., sensor networks), etc. In addition, while certain protocols and/or languages are shown, such as CIM, SCL, UML, XML, RDF, etc., other suitable protocols and/or languages may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A computer-implemented method, comprising:
   determining a grid topology of an electric grid based on one or more electric grid configuration description files;
   determining a configuration of a network topology of a computer network used to provide communication to grid devices of the electric grid, the network topology made up of a plurality of network devices, wherein determining the configuration of the network topology of the computer network includes mapping the virtual local area network (VLAN) configurations within the computer network;
   assessing whether the configuration of the network topology is configured to meet one or more communication requirements of the grid topology, wherein assessing includes overlaying the network topology on the grid topology and verifying that the VLAN configurations match the one or more communication requirements of the grid topology to prevent faults in the grid topology and the network topology; and
   triggering an automatic reconfiguration of the network topology to meet the one or more communication requirements of the grid topology in response to the network topology not being configured to meet the one or more communication requirements of the grid topology.

2. The method as in claim 1, further comprising:
   identifying a change in the grid topology; and, in response, reconfiguring the network topology to meet the one or more communication requirements of the grid topology based on the grid topology change.

3. The method as in claim 1, wherein the one or more communication requirements of the grid topology include: providing communication between all the devices of the electric grid; providing isolated communication within one or more specific subsets of all the devices of the electric grid; preventing communication between two or more specific subsets of all the devices of the electric grid; providing redundant communication between two or more specific subsets of all the devices of the electric grid; or providing a specific Quality of Service (QoS) for the communication.

4. The method as in claim 1, wherein determining the network topology comprises:
   discovering configurations of network devices already operating in the computer network.

5. The method as in claim 1, wherein determining the network topology comprises:
   receiving one or more grid device configuration description files;
   translating the one or more grid device configuration description files into corresponding network device commands; and
   configuring the network topology using the network device commands.

6. The method as in claim 1, further comprising:
   displaying a graphical user interface (GUI) that cooperatively illustrates the grid topology and network topology.

7. The method as in claim 6, wherein determining the network topology comprises:
   receiving one or more graphically based configuration commands to configure one or more corresponding grid devices;
   translating the one or more graphically based configuration commands into corresponding network device commands; and
   configuring the network topology using the network device commands.

8. The method as in claim 1, further comprising:
   utilizing the determined grid topology and network topology in an offline simulation.

9. The method as in claim 1, wherein the grid devices are intelligent end devices (IEDs); capacitor banks; grid controllers; phasor measurement units (PMUs); or sensors.

10. The method as in claim 1, wherein determining the grid topology is based on at least one of either a Common Information Model (CIM) model or a Substation Configuration Description Language (SCL) model, and wherein the electric grid configuration description files are Unified Modeling Language (UML) files.

11. An apparatus, comprising:
    one or more network interfaces to communicate with a computer network used to provide communication to grid devices of an electric grid;

a processor coupled to the network interfaces and adapted to execute one or more processes; and a memory configured to store process executable by the processor, the process when executed operable to:

determine a grid topology of the electric grid based on one or more electric grid configuration description files;

determine a configuration of a network topology of the computer network used to provide communication to the grid devices, the network topology made up of a plurality of network devices, wherein determining the configuration of the network topology of the computer network includes mapping the virtual local area network (VLAN) configurations within the computer network;

assess whether the configuration of the network topology is configured to meet one or more communication requirements of the grid topology, wherein assessing includes overlaying the network topology on the grid topology and verifying that the VLAN configurations match the one or more communication requirements of the grid topology to prevent faults in the grid topology and the network topology; and trigger an automatic reconfiguration of the network topology to meet the one or more communication requirements of the grid topology in response to the network topology not being configured to meet the one or more communication requirements of the grid topology.

12. The apparatus as in claim 11, wherein the process when executed is further operable to:

identify a change in the grid topology; and, in response, reconfigure the network topology to meet the one or more communication requirements of the grid topology based on the grid topology change.

13. The apparatus as in claim 11, wherein the one or more communication requirements of the grid topology include providing communication between all the devices of the electric grid; providing isolated communication within one or more specific subsets of all the devices of the electric grid; preventing communication between two or more specific subsets of all the devices of the electric grid; providing redundant communication between two or more specific subsets of all the devices of the electric grid; or providing a specific Quality of Service (QoS) for the communication.

14. A tangible, non-transitory, computer-readable media having software encoded thereon, the software when executed by a processor operable to:

determine a grid topology of an electric grid based on one or more electric grid configuration description files;

determine a configuration of a network topology of a computer network used to provide communication to grid devices of the electric grid, the network topology made up of a plurality of network devices, wherein determining the configuration of the network topology of the computer network includes mapping the virtual local area network (VLAN) configurations within the computer network;

assess whether the configuration of the network topology is configured to meet one or more communication requirements of the grid topology, wherein assessing includes overlaying the network topology on the grid topology and verifying that the VLAN configurations match the one or more communication requirements of the grid topology to prevent faults in the grid topology and the network topology; and trigger an automatic reconfiguration of the network topology to meet the one or more communication requirements of the grid topology in response to the network topology not being configured to meet the one or more communication requirements of the grid topology.

15. The computer-readable media as in claim 14, wherein the software when executed is further operable to:

identify a change in the grid topology; and, in response, reconfigure the network topology to meet the one or more communication requirements of the grid topology based on the grid topology change.

16. The computer-readable media as in claim 14, wherein the one or more communication requirements of the grid topology include providing communication between all the devices of the electric grid; providing isolated communication within one or more specific subsets of all the devices of the electric grid; preventing communication between two or more specific subsets of all the devices of the electric grid; providing redundant communication between two or more specific subsets of all the devices of the electric grid; or providing a specific Quality of Service (QoS) for the communication.

17. The computer-readable media as in claim 14, wherein the software when executed to determine the network topology is further operable to:

determine virtual local area network (VLAN) configurations within the computer network.

18. The computer-readable media as in claim 14, wherein the software when executed to determine the network topology is further operable to:

discover configurations of network devices already operating in the computer network.

19. The computer-readable media as in claim 14, wherein the software when executed to determine the network topology is further operable to:

receive one or more grid device configuration description files;

translate the one or more grid device configuration description files into corresponding network device commands; and configure the network topology using the network device commands.

20. The computer-readable media as in claim 14, wherein the software when executed is further operable to:

display a graphical user interface (GUI) that cooperatively illustrates the grid topology and network topology.

21. The computer-readable media as in claim 14, wherein the software when executed to determine the network topology is further operable to:

receive one or more graphically based configuration commands to configure one or more corresponding grid devices;

translate the one or more graphically based configuration commands into corresponding network device commands; and configure the network topology using the network device commands.

* * * * *